United States Patent [19]
Holtzman

[11] 3,779,081
[45] Dec. 18, 1973

[54] COMPRESSION TESTER
[75] Inventor: Norman Holtzman, Los Angeles, Calif.
[73] Assignee: Orion Industries, Inc., Los Angeles, Calif.
[22] Filed: Oct. 30, 1972
[21] Appl. No.: 302,292

[52] U.S. Cl............ 73/419, 73/116, 73/420
[51] Int. Cl. ............................................. G01l 7/16
[58] Field of Search............... 73/115, 116, 47, 73/419, 420; 116/118, 124.4, 133, 114 R, 124 R, 135

[56] References Cited
UNITED STATES PATENTS
2,620,656  12/1952  Peterson ............................ 73/47 X
3,320,801  5/1967  Rhindress ........................... 73/47 X Primary Examiner—Donald O. Woodiel
Attorney—Francis A. Utecht et al.

[57] ABSTRACT

A pressure indicator or gauge which utilizes a piston responsive to test pressure to move diagonally oriented indicator along a longitudinal axis. A display having a transverse slot is located adjacent the indicator. As the diagonally oriented indicator moves longitudinally, it undergoes an apparent transverse travel along the slot, and pressure indicia adjacent the slot provide an indication of the magnitude of the test pressure.

6 Claims, 6 Drawing Figures

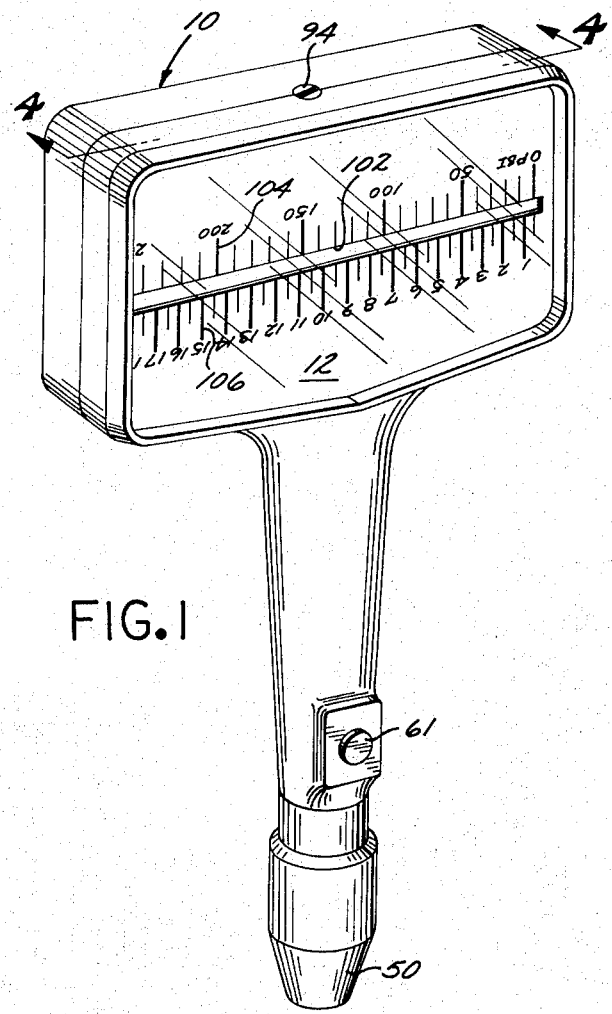
FIG.1
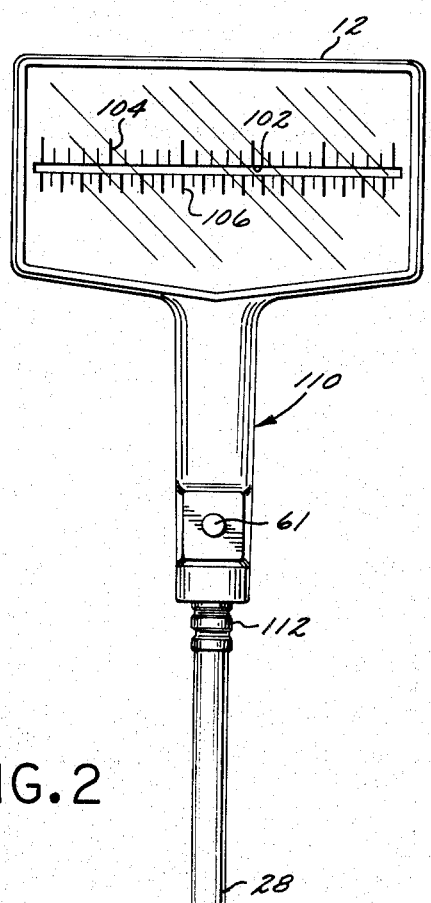
FIG.2
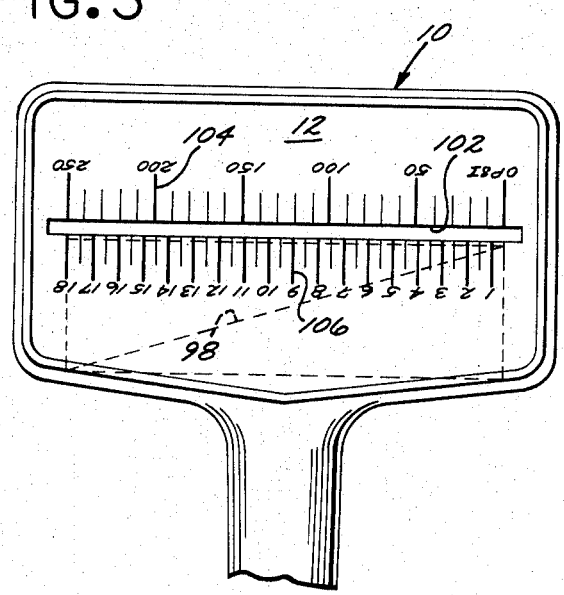
FIG.3
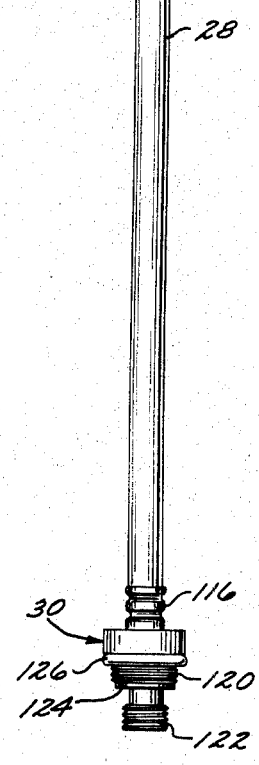

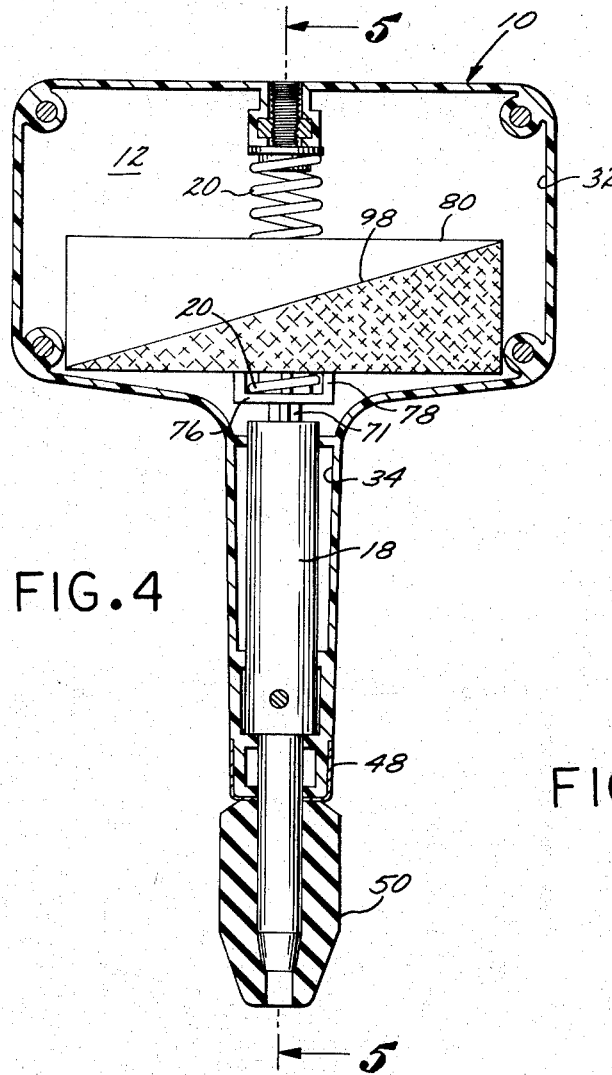
FIG.4
FIG.6
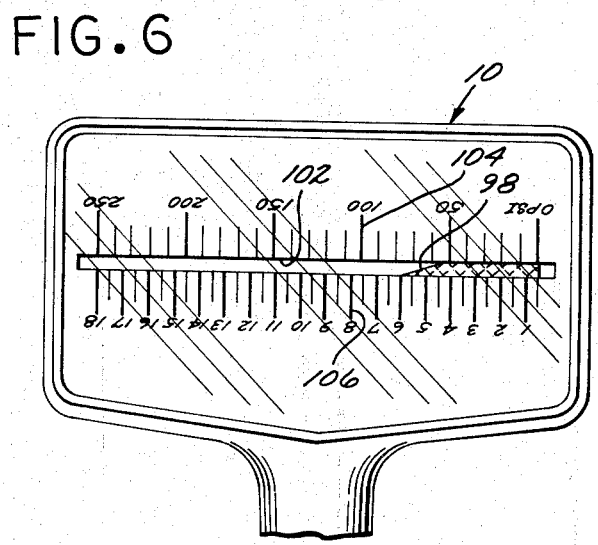
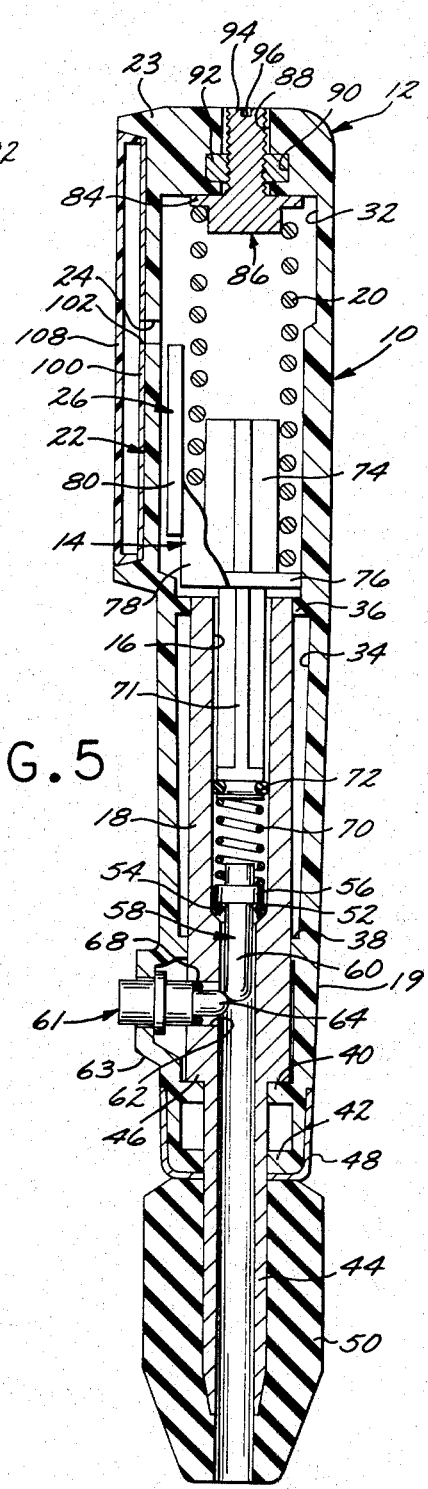
FIG.5

3,779,081

COMPRESSION TESTER

BACKGROUND OF THE INVENTION

1. Field of the Invention

The present invention relates to compression testers, and particularly compression testers for determining cylinder head pressures in an internal combustion piston engine.

2. Description of the Prior Art

Most conventional compression testers utilize a valve core which outwardly projects an indicator in proportion to the cylinder head pressure sensed, or utilize a pressure sensitive element operative to rotate an indicator needle or the like past a pressure indicia display. These devices are relatively expensive, sometimes fragile, and usually difficult to read.

SUMMARY OF THE INVENTION

According to the present invention, a compression tester is provided which employs a piston carrying a diagonal indicator movable longitudinally with the piston in response to cylinder head pressure. The tester includes a display having a viewing opening or slot extending generally normal or transversely of the longitudinal axis of movement of the piston. The diagonal indicator registers with the display slot and appears to traverse the length of slot upon longitudinal movement of the indicator. The diagonal indicator may simply be a line, or be defined as the line of demarcation between areas of different color. The latter arrangement is preferred because vivid, contrasting colors may be selected to greatly facilitate reading of the tester.

The tester is adapted to be fitted with a resilient, relatively fixed connector end which can be pressed into sealing relation against the usual spark plug port, or it may be provided with a flexible connector hose mounting a threaded fitting at the end for screwing into the spark plug port.

The compression tester is easy to handle and read, rugged, and relatively inexpensive.

A holding valve is provided in the tester to hold or trap the test pressure and maintain the pressure indication long enough so that the user can remove the tester and read it. A release element is operable to unseat the holding valve and thereby release the test pressure to ready the tester for further use.

BRIEF DESCRIPTION OF THE DRAWINGS

FIG. 1 is a perspective view of a compression tester according to the present invention;

FIG. 2 is a front elevational view of another embodiment, similar to the embodiment of FIG. 1, except that it utilizes a flexible connector hose rather than a fixed connector end;

FIG. 3 is a front elevational view of the display and indicator portions of the tester of FIG. 1, illustrating their positions in the absence of test pressure;

FIG. 4 is a view taken along the line 4—4 of FIG. 1;

FIG. 5 is an enlarged view taken along the line 5—5 of FIG. 4; and

FIG. 6 is a view similar to FIG. 3, but illustrating the position of the indicator when a test pressure exists.

DESCRIPTION OF THE PREFERRED EMBODIMENT

Referring now to the drawings, and particularly to FIGS. 1 and 3 through 6, there is illustrated a compression tester 10 comprising, generally, a T-shape body or case 12; a piston 14 movable longitudinally in an elongated cylinder 16 defined by a stem 18 carried in the vertical leg or lower portion 19 of the case 12; bias means in the form of a compression spring 20 operative to urge the piston 14 longitudinally in a direction opposite movement of the piston 14 in response to test pressure; a display 22 mounted in the transverse or upper portion 23 of the case 12 and defining a slot 24 extending transversely or generally normal to the axis of the cylinder 16; and an indicator 26 carried by the piston 14 and movable longitudinally therewith in adjacent relation to the slot 24, the relative movement of the indicator 26 with respect to the slot 24 yielding an indication of the extent of longitudinal movement of the piston 14 in response to a test pressure.

The compression tester 10 is of that type used by garage mechanics and individual car owners to determine cylinder head pressures, and is adapted to be mounted to the spark plug port (not shown) of the particular cylinder being tested. The compression tester 10 is adapted to be hand-held in position over the spark plug port. Another embodiment, that shown in FIG. 2, is very similar to the tester 10 except that, as will be seen, it includes a flexible hose 28 which mounts a screw adaptor 30 for threaded coupling to the spark plug port. The embodiment of FIG. 2 will be described in greater detail later.

With respect to the compression tester 10, the case 12 is preferably injection molded in front and rear halves secured together in any suitable manner to define a hollow interior. The interior is generally divided into a substantially rectangular upper compartment 32 and a generally cylindrical lower compartment 34.

A series of transverse ribs 36, 38, 40 and 42, each having a circular central opening, are integrally formed in the halves of the case 12 during molding. The elongated, generally cylindrical stem 18 fits within and is located by the ribs, and a reduced diameter stem portion 44 projects outwardly of the casing from the central opening in the rib 42. A shoulder 46 defined by the change in cross section of the stem 18 at the portion 44 rests upon the upper surface of the rib 40 to maintin the stem 18 in position.

A metal ferrule 48 is press-fitted about the case lower portion 19 to protect the plastic material of the case 12 from abuse, the ferrule 48 including a central opening through which the stem lower portion 44 projects.

A resilient, centrally bored end fitting 50 made of rubber or the like is press-fitted onto the projecting end of the stem lower portion 44, and because of its resilience is adapted to be forcibly seated in sealing relation upon a conventional spark plug port. The central bore in the fitting 50 and the communicating cylinder 16 constitute the pressure inlet to the tester.

The lower portion of the cylinder 16 is reduced in diameter, defining a seat 52 upon which is disposed a usual O-ring 54 for sealing. An annular flange 56 of a holding valve 58 rests upon the O-ring 54, and an integral, longitudinally extending valve stem 60 thereof extends downwardly through the O-ring 54.

The lower end of the stem 60 is rounded and normally in opposition or registry with a transverse passage 62 provided in the stem 60. A release valve 61 is transversely movable in the passage 62, and a reduced diameter inner portion 64 thereof projects into the cylinder 16 below the lower end of the holding valve stem 60.

The front half of the case 12 is molded to include a protuberant portion 63 having an opening through which the button or outer end of the release valve 61 extends, the outer end of the valve constituting a button which can be pressed inwardly to effect engagement with and upward movement of the holding valve 58. This unseats the flange 56 of the valve 58 from sealing engagement with the underlying O-ring 54.

The release valve 61 includes an annular flange 66 which engages the inner face of the margins defining the opening in the protuberant portion 63 to thereby constrain the valve 61 from coming out of position. A fluid tight seal is provided between the valve 61 and the passage 62 by an O-ring 68 fitted about the valve inner portion 64.

The holding valve 58 is normally biased downwardly into sealing engagement with the seat 52 by a compression spring 70 which is interposed between the holding valve flange 56 and the lower end of the piston 14. As will be seen, development of a test pressure at the pressure inlet of the tester has the effect of rasing the holding valve 58 against the bias of the spring 70, permitting this pressure to then develop against the piston 44 for upward movement thereof. However, when the test pressure at the pressure inlet drops, the holding valve 58 abruptly descends and seats, trapping or holding the test pressure within the upper portion of the cylinder 16 so that its effect upon the piston 14 can be maintained for an interval sufficient to allow the user to read the tester 10 at his leisure.

Depression or inward movement of the release valve 61 causes the inner portion 64 thereof to engage the lower end of the holding valve stem 60, unseating the valve 58 and thereby allowing any built-up pressure in the cylinder upper portion 16 to escape downwardly and out of the tester pressure inlet at the lower end.

The piston 14 is preferably injection molded of rugged plastic or the like and includes a lower piston rod portion 71 of cruciform section having an annulus at its lower extremity which receives an O-ring 72 to prevent pressure loss past the piston 14. An upper piston rod portion 74 of heavier cross-section constitutes a spring retainer which is separated from the lower rod portion by a generally rectangular, transversely oriented platform 76. As best seen in FIG. 4, a pair of longitudinally or vertically oriented walls 78 are integrally joined to side edges of the platform 76 and include front edges which are integrally attached to and support a generally rectangular indicator plate 80.

The lower end of the compression spring 20, which is made of high quality music wire or the like, is disposed upon and is retained in position by the upper piston rod portion 74, and bears against the platform 76. The upper end of the spring 20 bears against an annular flange 84 forming a part of an adjustment screw 86 which extends upwardly through an opening 88 molded in the case 12. An annulus 90 in communication with the opening 88 is also molded in the case 12, and receives a threaded nut 92 for threadable cooperation with an externally threaded, upwardly extending shank 94 of the screw 86. The upper end of the shank 94 includes a screw driver slot 96 by means of which the screw 86 can be rotated to adjust the effective spring force exerted by the spring 82.

As best seen in FIG. 4, the face of the rectangular indicator plate 80 is provided with paint, decalcomania, or the like of contrasting colors which adjoin to define a diagonally oriented indicator line 98.

The upper edge of the plate 80 is normally located below the case transverse slot 24 so that the indicator line 98 is not visible through the slot 24. However, when the piston 14 rises in response to a pressure at the tester pressure inlet, the indicator line 98, as best seen in FIG. 6, becomes visible through the slot 24 and appears to travel to the left along the slot 24 as the upward movement of the piston 14 and indicator plate 80 continues.

The slot 24 is integrally molded in a recessed portion of the case 12, as best seen in FIG. 5, and an indicia plate 100 forming part of the display 22 is suitably mounted within this recessed portion in overlying relation to the slot 24. The plate 100 includes a slot 102 in registry with the slot 24, and also includes a series of indicia 104 and 106 above and below the slot 102, respectively, as best seen in FIGS. 3 and 6.

A complementally shaped transparent cover or lens 108 is fitted in overlying relation to the plate 100 to protect the plate 100 and the interior of the case 12 from the elements.

In operation, the spark plug of the particular cylinder to be tested is removed and the rubber fitting 50 of the tester is pressed firmly against the spark plug port. The engine is turned or cranked to bring the engine piston upwardly to develop the cylinder head pressure at the tester pressure inlet. This developed pressure is constrained against escape past the release valve 61 by the O-ring 68, and instead acts against the holding valve 58, raising it off its seat 52 against the bias of the spring 70. This enables the test pressure to act against the lower end of the piston 14 to raise the piston 14 against the bias of the spring 20. This causes the diagonal indicator line 98 to appear to travel transversely along the length of the slot 102, and the indicia 104 or 106 yield an indication of the extent of the upward travel of the piston 14. This is substantially directly proportional to the magnitude of the test pressure.

The adjustment screw 86 is rotatable to adjust the force developed by the compression spring 20 to compensate for any discrepancies which may develop over the life of the tester.

Referring now to FIG. 2, a compression tester 110 is illustrated which is substantially identical to the tester 10 except for the manner of coupling the tester 110 to the sprak plug port. Like numerals are used to designate like parts for the two embodiments.

The tester 110 is not provided with a resilient end fitting 50, but instead includes a hose fitting 112 which crimps one end of the flexible hose 28 onto the projecting stem lower portion 44. A similar fitting 116 is utilized to crimp the opposite end of the hose onto a shank portion (not shown) of the screw adaptor 30. The adaptor is centrally bored and includes threaded portions 120 and 122 which allow the adaptor to be threaded into either standard 14mm or 18mm spark plug ports. A sealing washer 124 and a sealing O-ring 126 are carried by the adaptor 30 to insure a fluid tight connection when the adaptor 118 is screwed into position within the spark plug port of the cylinder being tested.

From the foregoing it is seen that the present compression testers 10 and 110 are rugged in construction, relatively maintenance free in operation. The configuration of the testers is such that they are easily held and handled by the user, and the orientation of the indicia 104 and 106 is such that readings can easily be taken without having to reorient the tester from its test position. The release valve 61 is handy so that it can be easily operated to vent pressure from a previous test to ready the tester for the next test. The diagonal indicator line 98 affords a clearly visible and easily readable display of the magnitude of the test pressure, and such indicia 104 and 106 may, for convenience, comprise English and metric calibrations, respectively.

Various modifications and changes may be made with regard to the foregoing detailed description without departing from the spirit of the invention.

I claim:

1. A compression tester comprising:
   means defining an elongated cylinder having a pressure inlet at one extremity;
   a piston movable longitudinally in said cylinder in response to test pressure developed at said pressure inlet;
   bias means tending to urge said piston longitudinally in a direction opposite the movement of said piston in response to said test pressure;
   display means carried by said first-mentioned means adjacent the extremity of said cylinder opposite said pressure inlet, and defining a viewing slot extending across said display means generally normal to the axis of said cylinder, said display means including indicia disposed along said slot; and
   indicator means carried by said piston and movable therewith adjacent said slot, said indicator means defining an indicator line extending diagonally relative to said slot whereby said indicator line undergoes an apparent transverse travel along said slot upon longitudinal movement of said indicator means with said piston.

2. A compression tester according to claim 1 wherein said first-mentioned means comprises a T-shape, hollow case and an elongated stem received within the vertical leg of the T, said stem including a central bore constituting said cylinder.

3. A compression tester according to claim 1 wherein said first-mentioned means comprises an elongated stem having a lower extremity adapted for disposition within the central bore of a fitting cooperative with a spark plug port.

4. A compression tester according to claim 1 and including screw adjustment means carried by said case and in engagement with said bias means, said screw adjustment means being operable to compress said bias means and thereby adjust the force exerted by said bias means against said piston.

5. A compression tester according to claim 1 wherein said cylinder includes a seat, and wherein said tester further comprises holding valve means upon said seat, and holding bias means urging said holding valve means onto said seat, whereby test pressure is retained between said piston and said holding valve means.

6. A compression tester according to claim 5 and including release valve means carried by said case in engagement with said holding valve means and selectively operable to move and unseat said holding valve means from said seat to enable said test pressure to escape.

* * * * *

UNITED STATES PATENT OFFICE
CERTIFICATE OF CORRECTION

Patent No. 3,779,081          Dated December 18, 1973

Inventor(s) Norman Holtzman

It is certified that error appears in the above-identified patent and that said Letters Patent are hereby corrected as shown below:

In the cover page, item [54], delete "COMPRESSION TESTER" and insert -- PRESSURE GAUGE --. In Column 1, line 1, delete "COMPRESSION TESTER" and insert -- PRESSURE GAUGE --; lines 4-7, delete "compression testers, and particularly compression testers for determining cylinder head pressures in an internal combustion piston engine" and insert -- pressure indicators or gauges --; line 9, delete "compression testers" and insert -- pressure gauges --; line 11, delete "cylinder head" and insert -- magnitude of the --; lines 17-18, delete "compression tester" and insert -- pressure indicator or gauge --; line 20, delete "cylinder head" and insert -- the test --; ; line 31, delete "The tester" and insert -- One embodiment of the present gauge --; line 33, after "port", insert -- of an internal combustion engine --; line 35 delete "compression tester" and insert -- pressure gauge --; line 50 delete "compression tester" and insert -- pressure gauge --; line 56, delete "tester" and insert -- gauge --; and line 63, delete "compres-"and insert -- pressure indicator or gauge --. In Column 2, line 1, delete "sion tester"; line 17, delete

-1-

UNITED STATES PATENT OFFICE
CERTIFICATE OF CORRECTION

Patent No. 3,779,081      Dated December 18, 1973

Inventor(s) Norman Holtzman      PAGE - 2

It is certified that error appears in the above-identified patent and that said Letters Patent are hereby corrected as shown below:

"compression tester 10 is of that type" and insert -- pressure gauge described herein by way of example may be --; line 19, delete "and is" and insert -- being --; line 21, delete "compression tester" and insert -- pressure gauge --; line 24, delete "tester" and insert -- gauge --; line 29, delete "compression tester" and insert -- gauge --; line 55, delete "tester" and insert -- gauge --. In Column 3, line 21, delete "tester" and insert -- gauge --. In Column 4, line 26, delete "tester" and insert -- gauge --; line 45, delete "compression tester" and insert -- pressure gauge --;

line 50, delete "tester" and insert -- gauge --; line 64, delete "com-" and insert -- pressure gauges --; line 65, delete "pression testers"; line 67, delete "testers" and insert -- gauges --. In Column 5, line 15, delete "compression tester" and insert -- pressure gauge --; line 10, delete "compression tester" and insert -- pressure gauge --; line 15, delete "compression tester" and insert -- pressure gauge --; line 21, delete "compression tester" and insert -- pressure gauge --; line 27, delete "compression tester" and insert -- pressure gauge --.

Signed and sealed this 15th day of April 1975.

(SEAL)
Attest:

RUTH C. MASON
Attesting Officer

C. MARSHALL DANN
Commissioner of Patents
and Trademarks

Disclaimer 3,779,081.—*Norman Holtzman*, Los Angeles, Calif. COMPRESSION TESTER. Patent dated Dec. 18, 1973. Disclaimer filed Mar. 29, 1989, by the assignee, Mr. Gasket Co.

Hereby enters this disclaimer to the entire term of said patent.
[*Official Gazette May 23, 1989*]